US012809981B2

(12) United States Patent
Griffin et al.

(10) Patent No.: US 12,809,981 B2
(45) Date of Patent: Nov. 24, 2026

(54) LIVE UPDATE OF A UNIKERNEL FOR IoT DEVICES ON EDGE NODES

(71) Applicant: Red Hat, Inc., Raleigh, NC (US)

(72) Inventors: Leigh Griffin, Waterford (IE); Luigi Mario Zuccarelli, Milan (IT); Sherine Khoury, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 206 days.

(21) Appl. No.: 18/535,749

(22) Filed: Dec. 11, 2023

(65) Prior Publication Data

US 2025/0190569 A1 Jun. 12, 2025

(51) Int. Cl.
*G06F 9/44* (2018.01)
*G06F 21/57* (2013.01)

(52) U.S. Cl.
CPC .................................. *G06F 21/572* (2013.01)

(58) Field of Classification Search
CPC ..................................................... G06F 21/572
See application file for complete search history.

(56) References Cited

U.S. PATENT DOCUMENTS

2011/0054643 A1* 3/2011 Law .................... G06F 11/3636 700/83
2018/0165110 A1* 6/2018 Htay ......................... G06F 8/65
2018/0375897 A1* 12/2018 Kawasaki ........... G06F 9/45558
2020/0151335 A1* 5/2020 Ayoub ...................... G06F 8/65
2022/0100859 A1* 3/2022 Chang ..................... G06F 8/658
2022/0278913 A1* 9/2022 Fardid ....................... G06F 8/65
2023/0052217 A1* 2/2023 Ort ............................ G06F 8/70

* cited by examiner

*Primary Examiner* — Qamrun Nahar
(74) *Attorney, Agent, or Firm* — Womble Bond Dickinson (US) LLP

(57) ABSTRACT

Embodiments of the present disclosure relate to managing or controlling an update of a unikernel. An update to a first unikernel may be obtained. A second unikernel is created from the update. Application state is transferred from the first unikernel to the second unikernel.

20 Claims, 5 Drawing Sheets

LIVE UPDATE OF A UNIKERNEL FOR IoT DEVICES ON EDGE NODES

TECHNICAL FIELD

Aspects of the present disclosure relate to cloud computing, and more particularly, to managing unikernel live-updates on Internet of Things (IoT) devices.

BACKGROUND

Unikernels can be a great fit for IoT, or edge, devices as they can be small, fast, and secure. However, for a device that has been deployed to the field, updating an "embedded" unikernel (for implementing new features or for patching bugs) can be difficult, as the application code may have been burned into the IoT hardware at assembly time. The problem becomes even larger when one considers thousands of devices deployed over a large geographical area. Often, updating an IoT device can require returning the device to the manufacturer for service.

BRIEF DESCRIPTION OF THE DRAWINGS

The described embodiments and the advantages thereof may be best understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
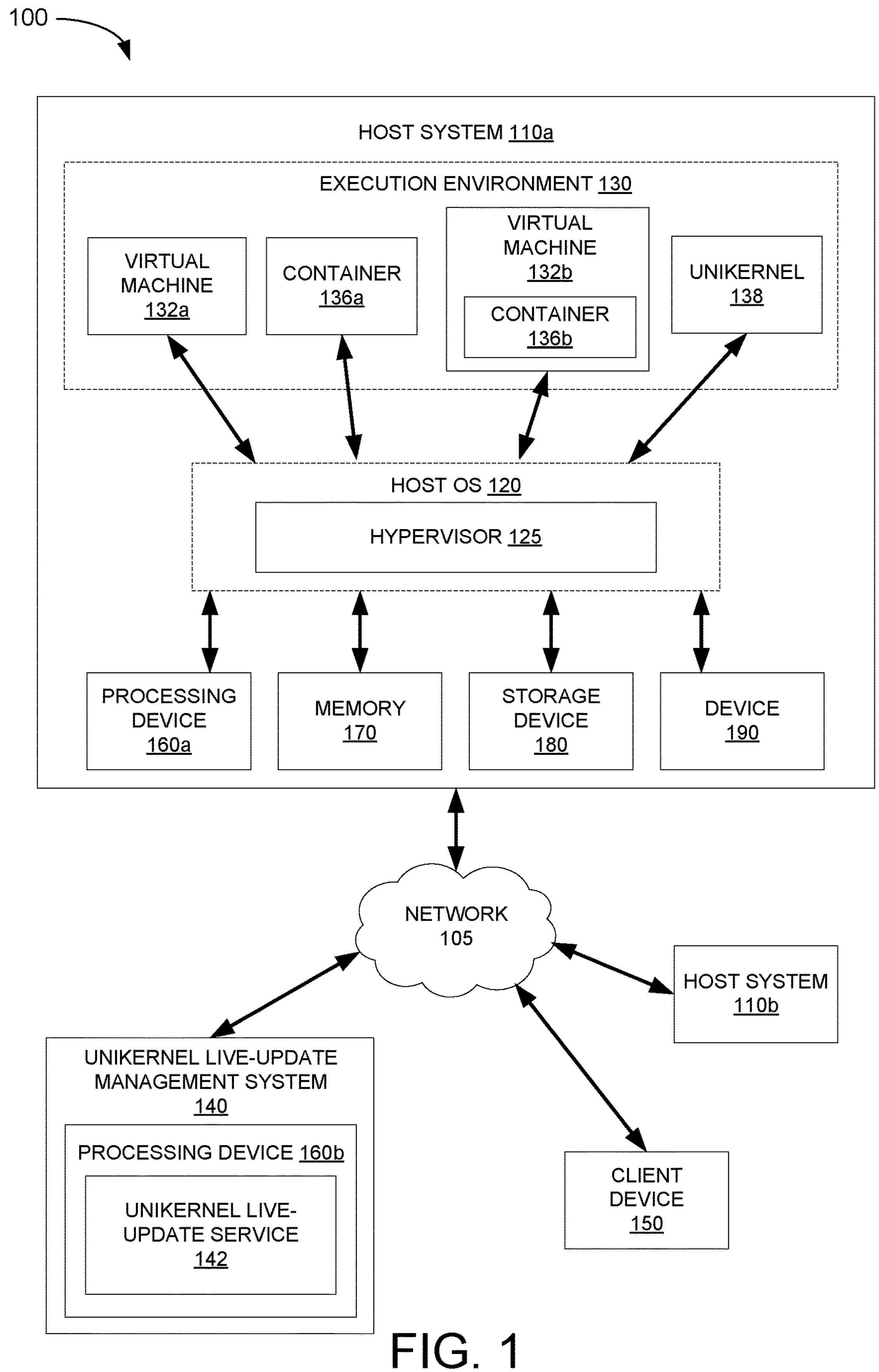
FIG. 1 is a block diagram that illustrates an example unikernel live-update management architecture, in accordance with some embodiments.

Unikernels represent a disruptive paradigm for building and deploying applications. Developed to address challenges associated with traditional monolithic and virtual machine-based architectures, unikernels offer a lightweight, secure, and highly efficient alternative. Unikernels can be viewed as an extension of library operating systems, or libOSs, in which the application and the operating system kernel are linked together as a single unit. Unikernels are single-purpose appliances that are compile-time specialized into standalone kernels, and sealed against modification when deployed to a cloud platform. In return they offer significant reduction in image sizes, improved efficiency and security, and operational costs. The architecture combines static type-safety with a single address-space layout that can be made immutable.

In a conventional operating system, application source code is first compiled into object files via a native-code compiler and then handed off to a linker that generates an executable binary. After compilation, a dynamic linker loads the executable and any shared libraries into a process with its own address space. The process can then communicate with the outside world by system calls, mediated by the operating-system kernel. Within the kernel, various subsystems such as the network stack or virtual memory system process system calls and interact with the hardware.

By contrast, unikernels are optimized for specific applications. They leverage a single address space, removing the need for context switching between user and kernel modes. This streamlined design significantly reduces the attack surface and minimizes resource overhead, making unikernels lightweight and inherently secure. The entire software stack of system libraries, language runtime, and applications can be compiled into a single bootable VM image that runs directly on a standard hypervisor. A unikernel running as a VM needs to implement only drivers for the virtual hardware devices of the hypervisor and can depend on the hypervisor to drive the real physical hardware. At the core of the unikernel philosophy is the principle of minimalism.

Unikernels can be developed using different approaches, each catering to specific programming languages and application types. LibOSs, such as MirageOS and IncludeOS, focus on creating unikernels for specific languages. MirageOS, for instance, is designed for OCaml applications, while IncludeOS targets C++ applications. These frameworks provide libraries and abstractions for developers to build applications that can be compiled directly into a unikernel image. Alternatively, some unikernel implementations, like the Erlang-based LING and the Java-based OSv, build unikernels by integrating language runtime components into the kernel. This approach allows developers to leverage the strengths of their preferred language while benefiting from the unikernel's performance and security advantages.

Unikernels also integrate configuration into the compilation process. Rather than treating the database, web server, etc., as independent applications that must be connected together by configuration files, unikernels treat them as libraries within a single application, allowing an application developer to configure them using either simple library calls for dynamic parameters, or build system tools for static parameters.

Unikernel typically share a number of characteristics. First, unikernel merge the application and operating system into a single address space, allowing for direct function calls instead of inter-process communication and context switching. This design contributes to improved performance and efficiency. Unikernels excel in terms of performance due to their minimalistic design, eliminating the overhead associated with context switching and inter-process communication. Additionally, unikernels strive for minimalism by excluding unnecessary components found in traditional operating systems. Generation of a unikernel involves as much compile-time work as possible to eliminate unnecessary features from the final unikernel. Unikernels link libraries that would normally be provided by the host operating system, allowing the unikernel tools to produce highly compact binaries via the normal linking mechanism. As a result, they have a smaller memory footprint, reduced attack surface, and faster boot times. Unikernels consume significantly fewer resources, allowing for better resource utilization and cost savings, making them ideal for resource-sensitive environments, e.g., edge of IoT devices. Here, a resource-sensitive environment can be an environment with limited processing, memory, or storage, for which the overhead of a multi-tasking operating system supporting virtual memory could be prohibitive. Furthermore, unikernels can be built using functional programming languages, enforcing immutability. Thus, once a unikernel is created, it remains unchanged throughout its lifecycle, providing better stability and repeatability of deployments-any code not present in the unikernel at compile time will never be run, preventing code injection attacks.

An edge device can be a piece of hardware that controls data flow at the boundary of a network. Edge devices can fulfill a variety of roles, depending on what type of device they are, but they essentially serve as network entry or exit points. Some common functions of edge devices can be the transmission, routing, processing, monitoring, filtering, translation, and storage of data passing to or from a network. Cloud computing and IoT devices have elevated the role of edge devices, ushering in the need for more intelligence, computing power and advanced services at the network edge. In the context of IoT, edge devices can encompass a much broader range of device types and functions such as sensors, actuators, and other endpoints. This concept, where processes are decentralized and occur in a more logical physical location, can be referred to as edge computing. Edge computing can involve moving workload closer to the user.

An IoT device can be a processing device comprising sensors, software, and connectivity features that enable it to collect, exchange, and sometimes act upon data. These devices are part of the broader concept of the Internet of Things, which involves connecting and integrating physical objects into the digital world. IoT devices can come in various forms and serve different purposes across industries. Examples include smart thermostats, fitness trackers, home security systems, connected appliances, e.g., smart refrigerators, industrial sensors, and even wearable medical devices. Other examples can include electronic control units (ECUs) within automobiles and trucks that can control the engine or transmission, as well as rolling up windows, unlocking doors, and the like. These devices can have sensors and switches that detect variables such as temperature, pressure, voltage, acceleration at different angles, braking, yaw and roll of the vehicle. IoT devices often communicate with other IoTs or with central systems, contributing to the creation of a network where information is shared and utilized for various applications.

The key characteristics of IoT devices include their ability to sense the environment, connect to a network (often the internet), and perform simple to complex tasks based on the data they collect. They play a crucial role in the development of smart homes, cities, and industries, enabling automation, data-driven decision-making, and improved efficiency in various aspects of daily life and business operations. A key difference between IoT devices and servers is the scale and scope of their operations. IoT devices can be diverse and widespread, often deployed across various environments and scenarios. They are designed to operate at the edge of the network, closer to the physical world where data is generated. In contrast, servers are centralized entities typically located in data centers, concentrating computational power and storage resources in a controlled environment. IoT devices often generate large amounts of real-time data that require immediate analysis and response. These devices may have limited computational capabilities, relying on offloading data to servers for processing. Servers, with their greater processing power and storage capacities, can be better-equipped to handle complex computations and efficiently manage large datasets.

Unikernels can run on various platforms, including hypervisors, e.g., Xen and KVM, and cloud providers, e.g., AWS and Google Cloud, using their hypervisor services for hardware portability. Deploying on a hypervisor such as Xen allows the use of the hypervisor's device drivers, affording the opportunity to build a practical, clean-slate unikernel that runs natively on cloud computing infrastructure. This portability can allow developers to deploy applications across different infrastructures. Unikernels can also achieve incredibly fast boot times, enabling quick scaling and deployment. This can be particularly beneficial in scenarios where applications need to start rapidly, such as in microservices architectures. Unikernels run above a hypervisor layer and treat it and the control domain as part of the trusted computing base. Unikernels can use the hypervisor as the sole unit of isolation and let applications trust external entities via protocol libraries such as SSL or SSH. Internally, unikernels can adopt a defense in depth approach by compile-time specialization, by pervasive type-safety in the running code, and via hypervisor extensions to protect against unforeseen compiler or runtime bugs.

Additionally, the streamlined design and single address space of unikernels can contribute to enhanced security. By minimizing an attack surface, unikernels reduce the potential for vulnerabilities and limit the impact of successful attacks. The minimized attack surface and immutability make unikernels inherently more secure than traditional operating systems. This can be especially critical in cloud and containerized environments, where security is a top concern. In some embodiments, security can be further improved by performing address space randomization at compile time using freshly generated linker scripts, without impeding compiler optimizations and without adding any runtime complexity.

This reduced complexity and immutability can also simplify management and reduce the need for frequent updates. The immutability of unikernel images can ensure consistent behavior across deployments. A unikernel is structured very differently from a conventional OS, in that all services, from the scheduler to the device drivers to the network stack, are implemented as libraries linked directly with the application. Coupled with the choice of a modern statically type-safe language for implementation, this affords configuration, performance, and security benefits to a unikernel. The unikernel model means that reconfiguring an appliance means recompiling it, potentially for every deployment.

Unikernels can lend themselves to a number of use cases, including microservices, edge computing, and containerless deployments. For example, unikernels can be tailored to individual microservices, leading to better resource utilization and performance. Additionally, the lightweight nature of unikernels can make them ideal for edge computing scenarios, where resource constraints are common. Then, unikernels can offer an alternative to traditional container technologies like Docker and Kubernetes. By eliminating the need for a container runtime, unikernels provide even greater resource efficiency and security. In some cases, multiple redundant copies of a unikernel can be run for scalability and availability. In some cases, multiple versions of a unikernel can be run for testing and verification. For example, the antilock braking system of an automobile that is controlled by a unikernel system may comprise multiple copies of the unikernel that are receiving inputs from multiple sets of sensors.

Unikernels are a great fit for IoT devices as they are small, fast and secure. IoT devices may also be termed edge devices. However, after shipping an IoT, new features may be desirable, or fixes to newly identified common vulnerabilities and exposures (CVEs) may need to be distributed. For such situations, it can be difficult to update the unikernel, due to the fact that for many IoT devices the code is "embedded," i.e., burnt in, at the time of assembly. Consequently, changing or updating the code must occur at a hardware level. This is often unfeasible, as the cost (either time or money) of updating thousands of IoT devices over a large geographical area may be prohibitive. In cloud computing the solution would be to recycle the instance and start a new virtual machine or container with the updates. With edge devices, a goal is to avoid having to recycle the device. Furthermore, because of the single address space of a unikernel, an "in-place update" cannot be performed. A unikernel must be stopped, and a new/updated unikernel "booted."

A solution to this issue involves using a "sidecar" or bootloader-like interaction between a "live-update" unikernel and other unikernels on an IoT device, to fetch a unikernel update from a remote location. A software sidecar is a small auxiliary program that runs alongside a more extensive program to provide additional functionality. Sidecars can be used when a main program lacks the necessary code to perform a specific task. The remote location can be a centralized service that serves as a registry of unikernel releases, or alternatively, a decentralized (mesh) collection of systems, e.g., an IoT swarm formation of devices from which an update can be obtained. When IoT devices are working in a swarm formation, it could be faster to use such an ad-hoc mechanism and protocols such as Message Queuing Telemetry Transport (MQTT), Google Remote Procedure Calls (gRPC), Bluetooth®, infrared (IR), or LongRange (LORA), to update a fleet, as opposed to having all devices attempting to simultaneously contact the centralized service.

After downloading an update, the live-update unikernel creates a new unikernel on the device. Application state can be transferred from the running unikernel to the new unikernel, and the new unikernel instantiated. In some embodiments, the old unikernel can be interrupted or terminated. In some embodiments, after a period of time during which the new unikernel is determined to be functioning as intended, the old unikernel is deleted. This allows a roll back to the original state in the event of a failed instantiation or a bad update.

In some scenarios, the new unikernel is a new release or update of the first unikernel. In other cases, the live-update mechanism loads a completely different unikernel, with other features or goals. The live-update mechanism can also verify the authenticity of the update before applying it.

In some embodiments, the live-update unikernel management system can update an underlying execution environment, e.g., hypervisor.

FIG. 1 is a block diagram that illustrates an example unikernel live-update management architecture 100, in accordance with some embodiments. However, other unikernel live-update management architectures are possible, and the implementation of a computer system utilizing examples of the disclosure are not limited to the specific architecture depicted by FIG. 1.

As shown in FIG. 1, unikernel live-update management architecture 100 includes host systems 110*a* and 110*b*, unikernel live-update management system 140, and client device 150. The host systems 110*a* and 110*b*, unikernel live-update management system 140, and client device 150 may each include hardware such as processing devices 160*a* and 160*b*, memory 170, which may include volatile memory devices, e.g., random access memory (RAM), non-volatile memory devices, e.g., flash memory, and/or other types of memory devices, a storage device 180, e.g., one or more magnetic hard disk drives, a Peripheral Component Interconnect (PCI) solid state drive, a Redundant Array of Independent Disks (RAID) system, or a network attached storage (NAS) array, and one or more devices 190, e.g., a Peripheral Component Interconnect (PCI) device, a network interface controller (NIC), a video card, or an I/O device. In certain implementations, memory 170 may be non-uniform access (NUMA), such that memory access time depends on the memory location relative to processing devices 160*a* and 160*b*. It should be noted that although, for simplicity, a single processing device 160*a* or 160*b*, storage device 180, and device 190 are depicted in FIG. 1, other embodiments of host systems 110*a* and 110*b*, unikernel live-update management system 140, and client device 150 may include multiple processing devices, storage devices, or devices. Processing devices 160*a* and 160*b* may include a complex instruction set computing (CISC) microprocessor, a reduced instruction set computing (RISC) microprocessor, a very long instruction word (VLIW) microprocessor, or a processor implementing other instruction sets or processors implementing a combination of instruction sets. Processing devices 160*a* and 160*b* may also include one or more special-purpose processing devices such as an application specific integrated circuit (ASIC), a field programmable gate array (FPGA), a digital signal processor (DSP), a network processor, or the like.

Each of the host systems 110*a* and 110*b*, unikernel live-update management system 140, and client device 150 may be a server, a mainframe, a workstation, a personal computer (PC), a mobile phone, a palm-sized computing device, etc. In some embodiments, host systems 110*a* and 110*b*, unikernel live-update management system 140, and/or client device 150 may be separate computing devices. In some embodiments, host systems 110*a* and 110*b*, unikernel live-update management system 140, and/or client device 150 may be implemented by a single computing device. For clarity, some components of unikernel live-update management system 140, host system 110*b*, and client device 150 are not shown. In some embodiments, unikernel live-update management system 140 may include a virtual machine-orchestration system. Furthermore, although on-the-fly confidential virtual machine architecture 100 is illustrated as having two host systems, embodiments of the disclosure may utilize any number of host systems.

Host systems 110*a* and 110*b*, and unikernel live-update management system 140, may also include an execution environment 130, which may include one or more virtual machines (VMs) 132*a*, containers 136*a*, containers 136*b* residing within virtual machines 132*b*, and a host operating system (OS) 120. Execution environment 130 may also include one or more unikernels 138. VMs 132*a* and 132*b* are software implementations of machines that execute programs as though they were actual physical machines. Containers 136*a* and 136*b* act as isolated execution environments for different workloads of services, as previously described. Host OS 120 manages the hardware resources of the host system 110*a* and provides functions such as interprocess communication, scheduling, memory management, and so forth.

Host OS 120 may include a hypervisor 125, also known as a virtual machine monitor (VMM), which can provide a virtual operating platform for VMs 132*a* and 132*b*, container 136*a*, and unikernel 138, and manage their execution. Hypervisor 125 may manage system resources, including access to physical processing devices, e.g., processors or CPUs, physical memory, e.g., RAM, storage devices, e.g., HDDs or SSDs, and other devices, e.g., sound cards or video cards. The hypervisor 125, typically implemented in software, may emulate and export a bare machine interface to higher level software in the form of virtual processors and guest memory. Higher level software may comprise a standard or real-time OS, may be a highly stripped-down operating environment with limited operating system functionality, and may include traditional OS facilities, etc. Hypervisor 125 may present other software, i.e., "guest" software, the abstraction of one or more VMs that provide the same or different abstractions to various guest software, e.g., a guest operating system or guest applications. It should be noted that in some alternative implementations, hypervisor 125 may be external to host OS 120, rather than embedded within host OS 120, or may replace host OS 120.

The host systems 110*a* and 110*b*, unikernel live-update management system 140, and client device 150 are coupled to each other, e.g., may be operatively coupled, communicatively coupled, or may communicate data/messages with each other, via network 105. Network 105 may be a public network, e.g., the internet, a private network, e.g., a local area network (LAN) or a wide area network (WAN), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment and communication towers, e.g., cell towers. The network 105 may carry communications, e.g., data, messages, packets, or frames, between the various components of host systems 110*a* and 110*b*, unikernel live-update management system 140, and/or client device 150.

In some embodiments, processing device 160*b* may execute unikernel live-update service 142. In some embodiments, unikernel 138 may send a request for an update to unikernel live-update management system 140. In some embodiments, unikernel live-update management system 140 may respond with an update. In some embodiments, live-update management system 140 notifies unikernel 138 of an available update. In some embodiments, live-update management system 140 pushes an available update to unikernel 138. In some embodiments, receipt of the update by a live-update unikernel may result in creation of a new unikernel. In some embodiments the live-update unikernel and the new unikernel may be examples of unikernel 138. In some embodiments, the live-update kernel validates the update. In some embodiments, application state is transferred from a running unikernel to the new unikernel. In some embodiments, application state is transferred in blocks of memory. In some embodiments the running unikernel may be an example of unikernel 138. In some embodiments, the execution environment may instantiate the new unikernel. In some embodiments, the previously running unikernel is terminated. In some embodiments, the previously running unikernel is deleted. Further details regarding unikernel live-update service 142 will be discussed at FIGS. 2-5 below.

Figure 2:
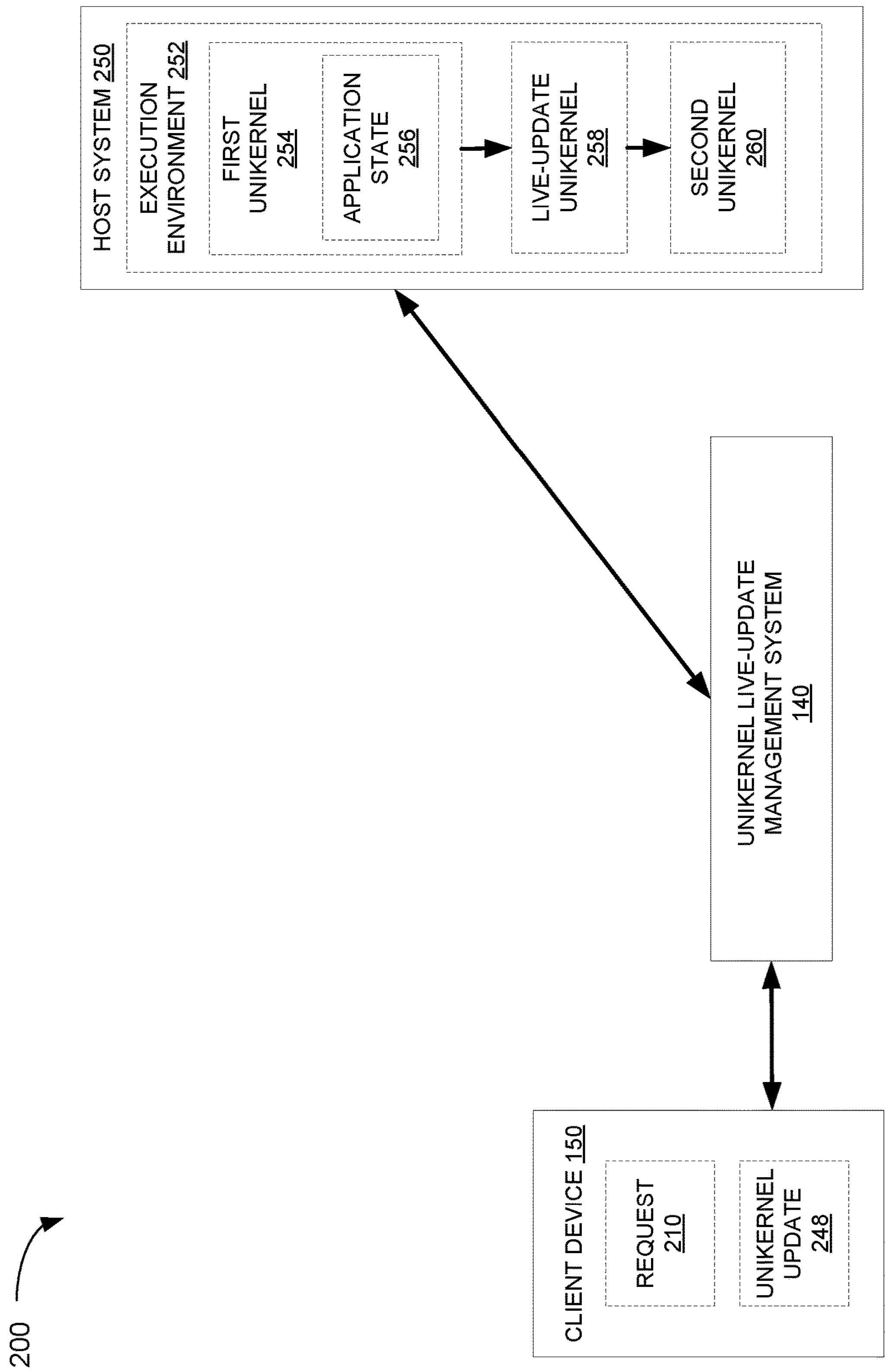
FIG. 2 is a block diagram of a unikernel live-update management architecture, in accordance with some embodiments.

FIG. 2 contains client device 150, in which a request 210 has resulted in unikernel update 248 being placed on the client device and subsequently deployed to unikernel live-update management system 140. In some embodiments, unikernel live-update management system 140 corresponds to unikernel live-update management system 140 of FIG. 1. FIG. 2 also includes host system 250, which in some embodiments corresponds to host system 110*a* of FIG. 1, and includes execution environment 252. Host OS 120 and hypervisor 125 of FIG. 1 are omitted from FIG. 2 for brevity. In some embodiments, host system 250 is an IoT device. In some embodiments, execution environment 252 corresponds to execution environment 130 of FIG. 1. In some embodiments, execution environment 252 includes first unikernel 254 and live-update unikernel 258. In some embodiments, first unikernel 254 and live-update unikernel 258 correspond to unikernel 138 of FIG. 1. In some embodiments, unikernel live-update service 142 corresponds to unikernel live-update service 142 of FIG. 1.

Referring to FIG. 2, in some embodiments, live-update unikernel 258 requests a unikernel update 248 from unikernel live-update management system 140. In some embodiments, this request is satisfied by a unikernel live-update service corresponding to unikernel live-update service 142 of FIG. 1. In some embodiments, live-update unikernel 258 retrieves unikernel update 248 from the unikernel live-update management system 140. In some embodiments, live-update management system 140 notifies live-update unikernel 258 of an available update. In some embodiments, live-update management system 140 queries version information from first unikernel 254, second unikernel 260, and live-update unikernel 258. In some embodiments, live-update management system 140 pushes an available update to live-update unikernel 258. In some embodiments, live-update unikernel 258 authenticates unikernel update 248. In some embodiments, live-update unikernel 258 uses the unikernel update to construct second unikernel 260. In some embodiments, live-update unikernel 258 validates that second unikernel 260 is operational. In some embodiments, live-update unikernel 258 validates second unikernel 260 using metrics received from second unikernel 260.

In some embodiments, live-update unikernel 258 communicates with first unikernel 254 via an endpoint and transfers application state 256 from first unikernel 254 to second unikernel 260. In some embodiments, the endpoint comprises a network address and a port number. In some embodiments, application state 256 is transferred in blocks of memory. In some embodiments, live-update unikernel 258 launches second unikernel 260. In some embodiments, after a period of time, live-update unikernel 258 interrupts or terminates first unikernel 254. In some embodiments, after a period of time, live-update unikernel 258 deletes first unikernel 254. In some embodiments, live-update kernel 258 collects the state information, e.g., memory, CPU, stack, buffers, etc., of the first unikernel 254. In some embodiments, this state information is obtained by execution environment 252, e.g., a hypervisor, within host system 250. In some embodiments, live-update unikernel 258 directs execution environment 252 on host system 250 to create a second unikernel 260 including the application state 256 of first unikernel 254. In some embodiments, access between unikernel is restricted. For example, in an embodiment, live-update unikernel 258 can access both first unikernel 254 and second unikernel 260. However, neither of first unikernel 254 nor second unikernel 260 can access the other. As another example, in an embodiment, only live-update unikernel 258 can shut down first unikernel 254.

In some embodiments, unikernel live-update management system 140 sends sets of messages to the second unikernel 260 to verify functionality. In some embodiments, these messages may include payloads simulating sensor inputs. In some embodiments, these messages may be sent to multiple redundant copies of the second unikernel 260.

In some embodiments, live-update management system 140 polls another system, finds a new unikernel, verifies the new unikernel, and determines to commence an update process. The polled system can be remote, centralized, or a peer. In some embodiments, live-update management system 140 starts the update process, which can involve starting a new unikernel with an update (e.g., second unikernel 260), transferring state (e.g., application state 256) from an executing unikernel (e.g., first unikernel 254), and terminating the existing unikernel. In some embodiments, first unikernel 254 is only queried for its state and then terminated with a kill signal.

Figure 3:
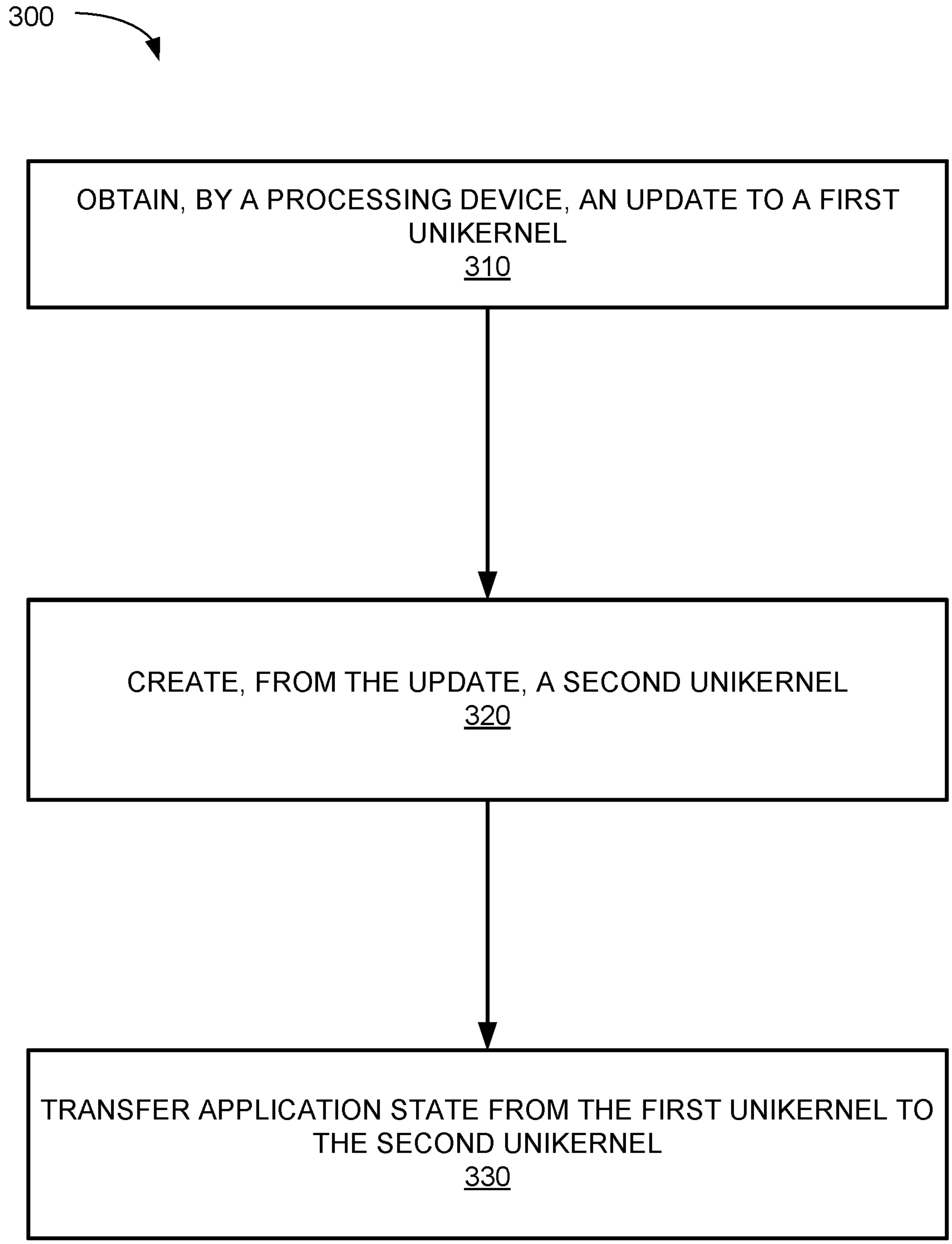
FIG. 3 is a flow diagram of a method of managing or controlling a unikernel live-update, in accordance with some embodiments.

FIG. 3 is a flow diagram of a method 300 of managing or controlling a unikernel live-update, in accordance with some embodiments. Method 300 may be performed by processing logic that may comprise hardware, e.g., circuitry, dedicated logic, programmable logic, a processor, a processing device, a central processing unit (CPU), a system-on-a-chip (SoC), software, e.g., instructions running/executing on a processing device, firmware, e.g., microcode, or a combination thereof. In some embodiments, at least a portion of method 300 may be performed by unikernel live-update management system 140 of FIG. 1.

With reference to FIG. 3, method 300 illustrates example functions used by various embodiments. Although specific function blocks ("blocks") are disclosed in method 300, such blocks are examples. That is, some embodiments are well suited to performing various other blocks or variations of the blocks recited in method 300. It is appreciated that the blocks in method 300 may be performed in an order different than presented, and that not all of the blocks in method 300 may be performed.

Method 300 begins at block 310, where the processing logic obtains an update to a first unikernel. In some embodiments, the update is obtained from a remote location. The remote location can be a centralized service that serves as a registry of unikernel releases, or alternatively, a decentralized (mesh) collection of systems, e.g., an IoT swarm formation of devices from which an update can be obtained. In some embodiments, the update corresponds to unikernel update 248 of FIG. 2. In some embodiments, live-update management system 140 of FIG. 1 notifies the processing logic of an available update. In some embodiments, live-update management system 140 pushes an available update to the processing logic. In some embodiments, the update is obtained by live-update unikernel 258 of FIG. 2. In some embodiments, the processing logic authenticates the update. In some embodiments, the update is obtained from unikernel live-update management system 140 of FIG. 2.

At block 320, the processing logic creates, from the update, a second unikernel. In some embodiments, receipt of the update by a live-update unikernel may result in creation of a new unikernel. In some embodiments, the update may correspond to unikernel update 248 of FIG. 2. In some embodiments the live-update unikernel and the new unikernel may be examples of unikernel 138 of FIG. 1. In some embodiments, the live-update kernel validates the update. In some embodiments, the unikernels run within an execution environment. In some embodiments, the execution environment corresponds to execution environment 252 of FIG. 2 and execution environment 130 of FIG. 1.

At block 330, the processing logic transfers application state from the first unikernel to the second unikernel. In some embodiments, application state is transferred in blocks of memory. In some embodiments, the first unikernel corresponds to first unikernel 254 of FIG. 2. In some embodiments, the second unikernel corresponds to second unikernel 260 of FIG. 2. In some embodiments, the application state corresponds to application state 256 of FIG. 2. In some embodiments, application states can comprise a simple enumeration, e.g., "READY," "RUNNING," "FAILED," or "STOPPED." In some embodiments, processing logic queries and updates these states. In some embodiments, processing logic can specify sensors that are connected to a unikernel. In some embodiments, processing logic can specify other unikernels with which a unikernel is in contact, e.g., a swarm formation. In some embodiments, processing logic can persist, e.g., cache, data intended for a unikernel that isn't yet available. In some embodiments, processing logic can cause an execution environment to query an upper/lower memory address range from the first unikernel, copy that range of memory to a free contiguous block of memory within the execution environment, and after verification of the second unikernel, start the second unikernel with the address and size of that block of memory (passed as parameters to the second unikernel). In some embodiments, this block of memory may be termed a snapshot. In some embodiments, this snapshot includes memory contents, stack contents, and buffer contents of a running unikernel. In some embodiments, the first unikernel is interrupted or terminated. In some embodiments, after a period of time during which the new unikernel is determined to be functioning as intended, the first unikernel is deleted. While avoiding running out of storage space on the IoT device, delaying deletion of an old unikernel allows a roll back to a previous unikernel in the event of a failed instantiation or a bad update.

Figure 4:
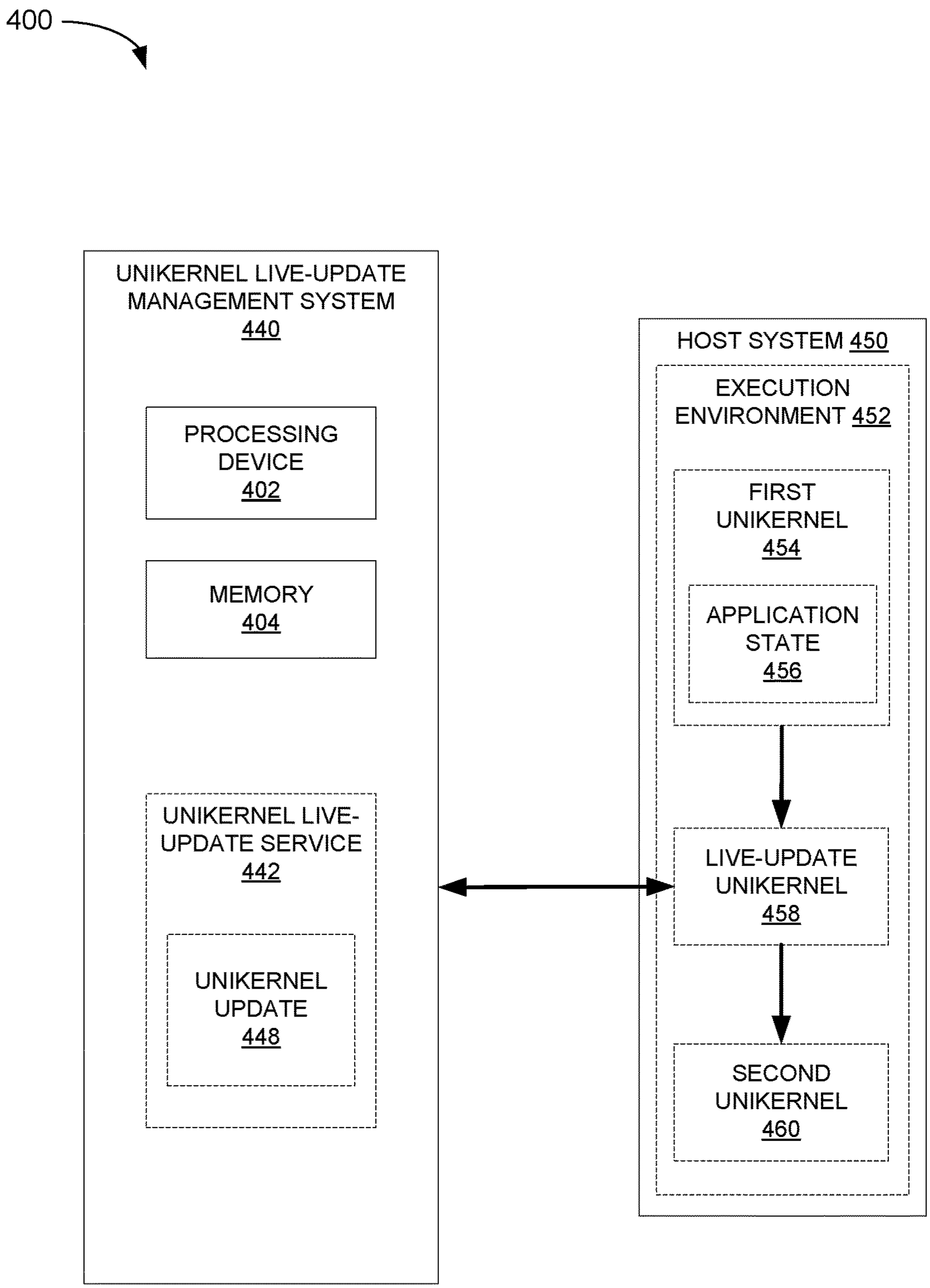
FIG. 4 is a component diagram depicting an example unikernel live-update management architecture, in accordance with embodiments of the disclosure.

FIG. 4 is a component diagram depicting an example unikernel live-update management architecture 400, in accordance with embodiments of the disclosure. The unikernel live-update management architecture 400 includes unikernel live-update management system 440, processing device 402, memory 404, unikernel live-update service 442, unikernel update 448, host system 450, execution environment 452, first unikernel 454, application state 456, live-update unikernel 458, and second unikernel 460. Unikernel live-update management system 440 may correspond to host system 110*a* of FIG. 1. Host system 450 may correspond to host system 110*a* of FIG. 1. Unikernel live-update management system 440 may include an execution environment that may correspond to execution environment 130 of FIG. 1. An execution environment included in unikernel live-update management system 440 may include VMs, containers, one or more containers within a VM, or one or more unikernels. Unikernel live-update management system 440 may include any number of execution environments. Unikernel live-update management system 440 may correspond to unikernel live-update management system 140 of FIG. 1. Unikernel live-update service 442 may correspond to unikernel live-update service 142 of FIG. 1. In some embodiments, processing device 402 may correspond to processing device 160*a* of FIG. 1. In some embodiments, memory 404 may include volatile memory devices, e.g., random access memory (RAM), non-volatile memory devices, e.g., flash memory, and/or other types of memory devices.

Unikernel live-update management system 440 may receive a request for unikernel update 448 from live-update unikernel 458, causing processing device 402 and memory 404 to submit instructions to unikernel live-update service 442 to send unikernel update 448 to live-update kernel 458. In some embodiments, unikernel live-update management system 440 sends a notification to live-update unikernel 258 of an available unikernel update 448. In some embodiments, live-update kernel 458 verifies the unikernel update 448. In some embodiments, live-update unikernel 458, using unikernel update 448, creates second unikernel 460. In some embodiments, live-update unikernel 458 causes application state 456 to be transferred from first unikernel 454 to second unikernel 460. In some embodiments, first unikernel 454, live-update unikernel 458, and second unikernel 460, reside within execution environment 452. In some embodiments, execution environment 452 corresponds to execution environment 252 of FIG. 2 and execution environment 130 of FIG. 1. In some embodiments, first unikernel 454, application state 456, live-update unikernel 458, and second unikernel 460 correspond, respectively, to first unikernel 254, application state 256, live-update unikernel 258, and second unikernel 260 of FIG. 2. In some embodiments, first unikernel 454, live-update unikernel 458, and second unikernel 460 correspond, respectively, to unikernel 138 of FIG. 1. In some embodiments, application state is transferred in blocks of memory. It should be noted that unikernel live-update service 442, unikernel update 448, execution environment 452, first kernel 454, application state 456, live-update unikernel 458, and second unikernel 460 are shown for illustrative purposes only and are not physical components of unikernel live-update management system 440.

Figure 5:
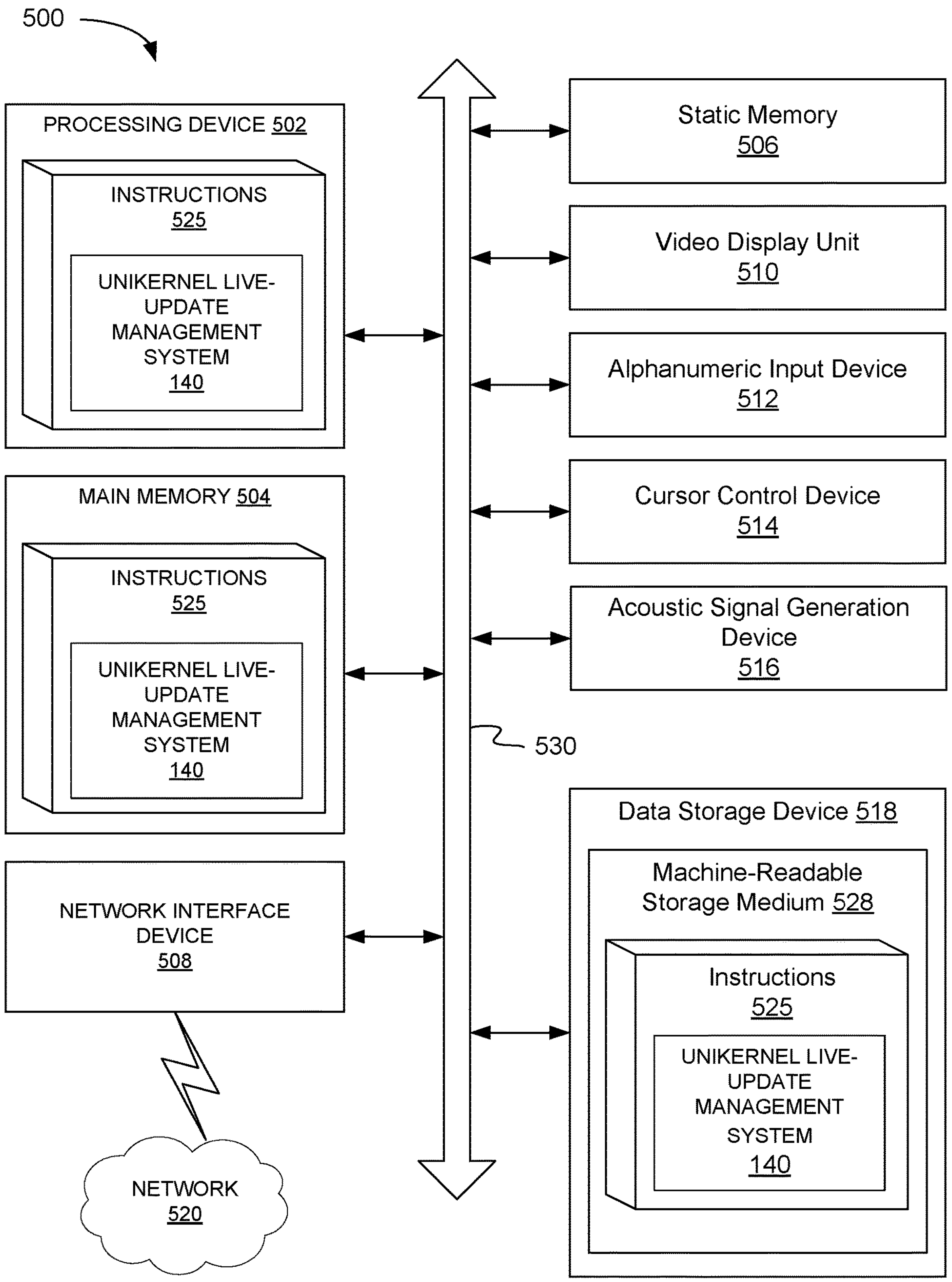
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, a switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device 502, e.g., a general-purpose processor or a programmable logic device (PLD), a main memory 504, e.g., a synchronous dynamic random-access memory (DRAM) or a read-only memory (ROM), a static memory 506, e.g., flash memory, and a data storage device 518, which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), a network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510, e.g., a liquid crystal display (LCD) or a cathode ray tube (CRT), an alphanumeric input device 512, e.g., a keyboard, a cursor control device 514, e.g., a mouse, and an acoustic signal generation device 516, e.g., a speaker. In one embodiment, video display unit 510, alphanumeric input device 512, and cursor control device 514 may be combined into a single component or device, e.g., an LCD touch screen.

Data storage device 518 may include a computer-readable storage medium 528 on which may be stored one or more sets of instructions 525 that may include instructions for a unikernel live-update management system 140, further including a unikernel live-update management service (not shown) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a network 520 via network interface device 508.

While computer-readable storage medium 528 is shown in an illustrative example to be a single medium, the term "computer-readable storage medium" should be taken to include a single medium or multiple media, e.g., a centralized or distributed database and/or associated caches and servers, which stores the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "obtaining," "creating," "transferring," "probing," "deleting," or "authenticating," or the like, refer to actions and processes performed or implemented by computing devices that manipulate and transform data represented as physical (electronic) quantities within the computing device's registers and memories into other data similarly represented as physical quantities within the computing device memories or registers, or other such information storage, transmission, or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" connotes structure by indicating that the units/circuits/components include structure, e.g., circuitry, which performs the task or tasks during operation. As such, the unit/circuit/component can be said to be configured to perform the task, or is configurable to perform the task, even when the specified unit/circuit/component is not currently operational, e.g., is not on. The units/circuits/components used with the "configured to" or "configurable to" language include hardware, e.g., circuits and memory storing program instructions executable to implement the operation. Reciting that a unit/circuit/component is "configured to" perform one or more tasks, or is "configurable to" perform one or more tasks, is expressly intended to not invoke 35 U.S.C. § 112 (f) for that unit/circuit/component. Additionally, "configured to" or "configurable to" can include generic structure, e.g., generic circuitry, which is manipulated by software and/or firmware, e.g., an FPGA or a general-purpose processor executing software, to operate in manner that is capable of performing the task(s) at issue. "Configured to" may also include adapting a manufacturing process, e.g., a semiconductor fabrication facility, to fabricate devices, e.g., integrated circuits, which are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

obtaining, by a processing device, an update to a first unikernel;

creating, from the update, a second unikernel;

receiving a simulated sensor input to the second unikernel to verify functionality of the second unikernel;

transferring application state from the first unikernel to the second unikernel;

in response to determining that the second unikernel continues to function for a period of time, deleting the first unikernel after the period of time; and in response to determining that the second unikernel fails to function during the period of time, rolling back the application state from the second unikernel to the first unikernel.

2. The method of claim 1, wherein the processing device is an Internet of Things (IoT) device.

3. The method of claim 1, wherein obtaining the update further comprises probing a remote system.

4. The method of claim 3, wherein the remote system is a centralized server, the centralized server comprising a registry of unikernel releases.

5. The method of claim 3, wherein the remote system is a decentralized mesh, the decentralized mesh comprising a set of one-hop networking devices.

6. The method of claim 1, further comprising terminating the first unikernel.

7. The method of claim 1, wherein the update is authenticated before creating the second unikernel.

8. A system comprising:

a memory; and a processing device, operatively coupled to the memory, to:

obtain, by the processing device, an update to a first unikernel;

create, from the update, a second unikernel;

receive a simulated sensor input to the second unikernel to verify functionality of the second unikernel;

transfer application state, from the first unikernel, to the second unikernel;

in response to determining that the second unikernel continues to function for a period of time, delete the first unikernel after the period of time; and in response to determining that the second unikernel fails to function during the period of time, roll back the application state from the second unikernel to the first unikernel.

9. The system of claim 8, wherein the processing device is an IoT device.

10. The system of claim 8, wherein to obtain the update, the processing device is further to probe a remote system.

11. The system of claim 10, wherein the remote system is a centralized server, the centralized server comprising a registry of unikernel releases.

12. The system of claim 10, wherein the remote system is a decentralized mesh, the decentralized mesh comprising a set of one-hop networking devices.

13. The system of claim 8, wherein the processing device is further to terminate the first unikernel.

14. The system of claim 8, wherein the processing device is further to authenticate the update before creating the second unikernel.

15. A non-transitory computer-readable storage medium including instructions that, when executed by a processing device, cause the processing device to:

obtain, by the processing device, an update to a first unikernel;

create, from the update, a second unikernel;

receive a simulated sensor input to the second unikernel to verify functionality of the second unikernel;

transfer application state, from the first unikernel, to the second unikernel;

in response to determining that the second unikernel continues to function for a period of time, delete the first unikernel after the period of time; and in response to determining that the second unikernel fails to function during the period of time, roll back the application state from the second unikernel to the first unikernel.

16. The non-transitory computer-readable storage medium of claim 15, wherein the processing device is an IoT device.

17. The non-transitory computer-readable storage medium of claim 15, wherein the instructions further cause the processing device to obtain the update by probing a remote system.

18. The non-transitory computer-readable storage medium of claim 16, wherein the remote system is a centralized server, the centralized server comprising a registry of unikernel releases.

19. The non-transitory computer-readable storage medium of claim 16, wherein the remote system is a decentralized mesh, the decentralized mesh comprising a set of one-hop networking devices.

20. The non-transitory computer-readable storage medium of claim 15, wherein the instructions further cause the processing device to terminate the first unikernel.

* * * * *